Sept 1, 1925.
C. D. GRIFFIN
GRAIN SHOCKER
Filed Jan. 26, 1920
1,551,555
3 Sheets-Sheet 1
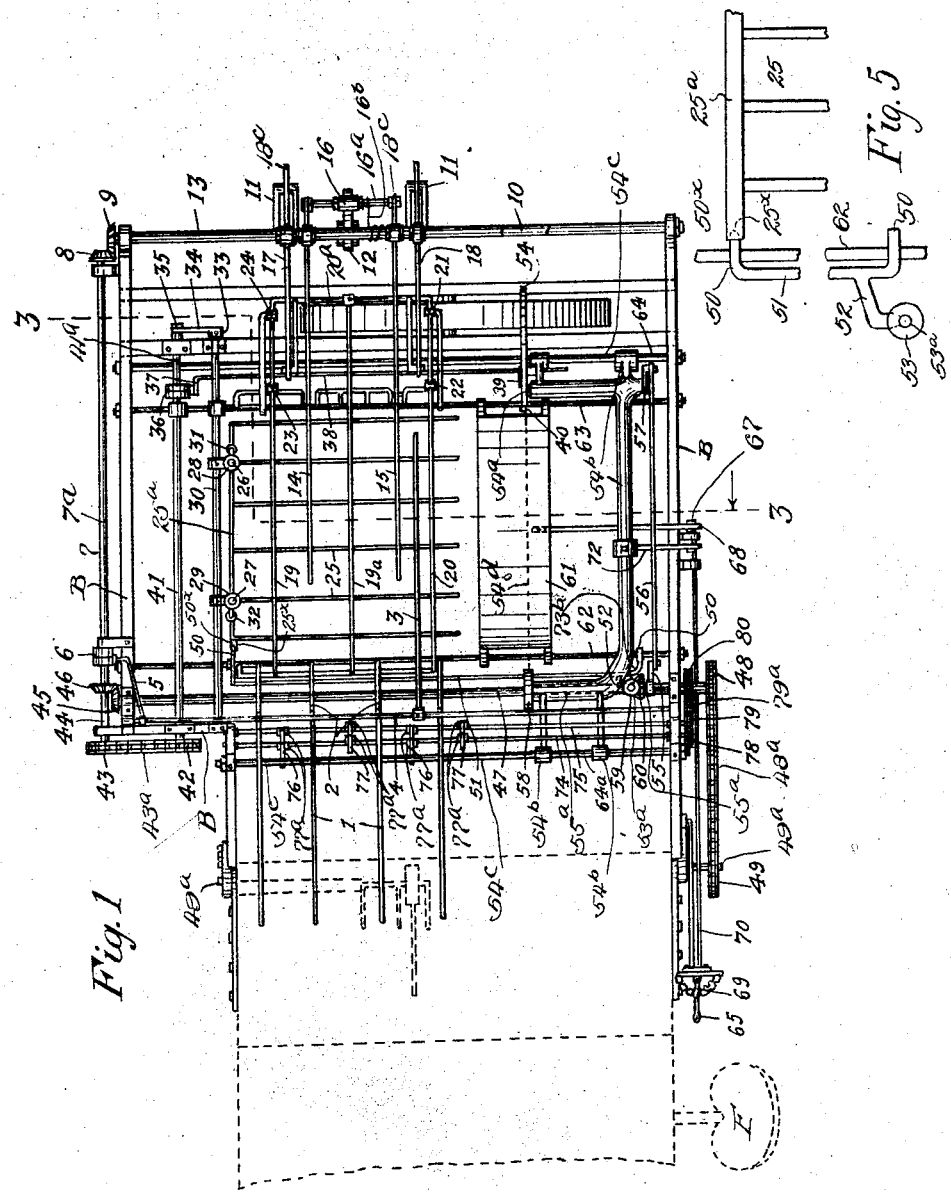
Inventor:
Clayton D Griffin

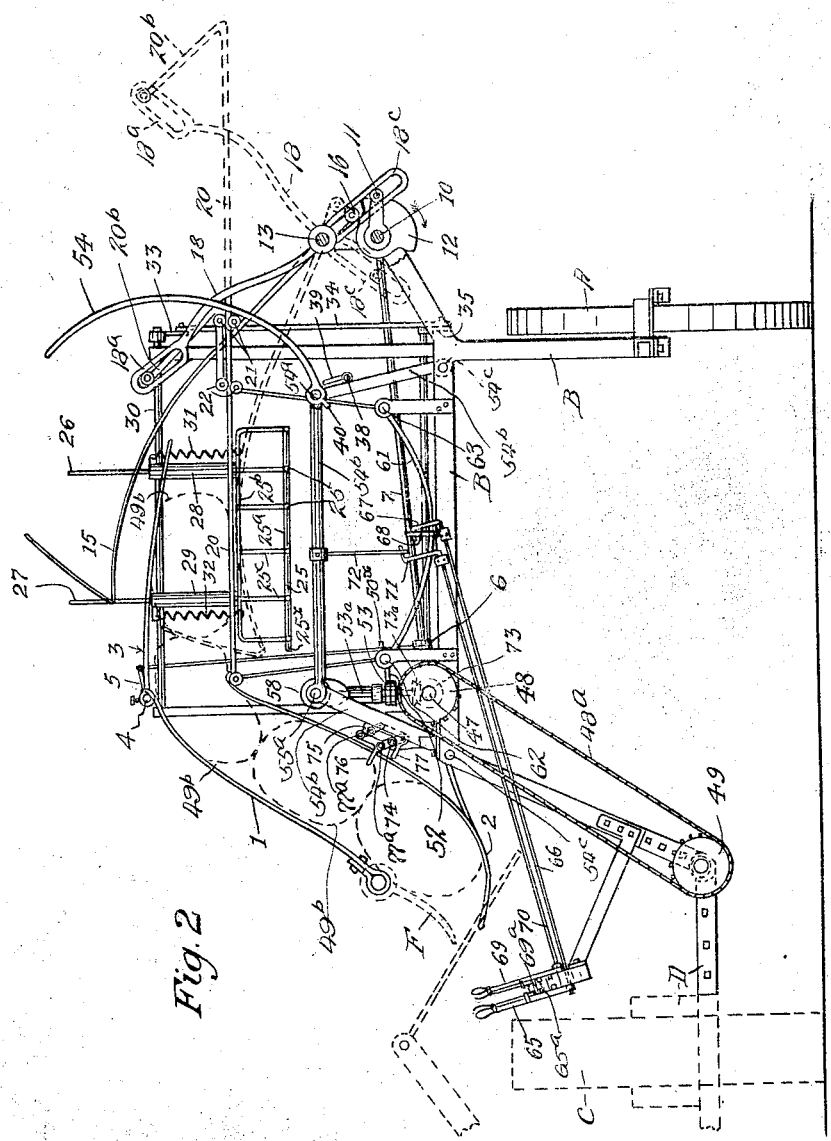

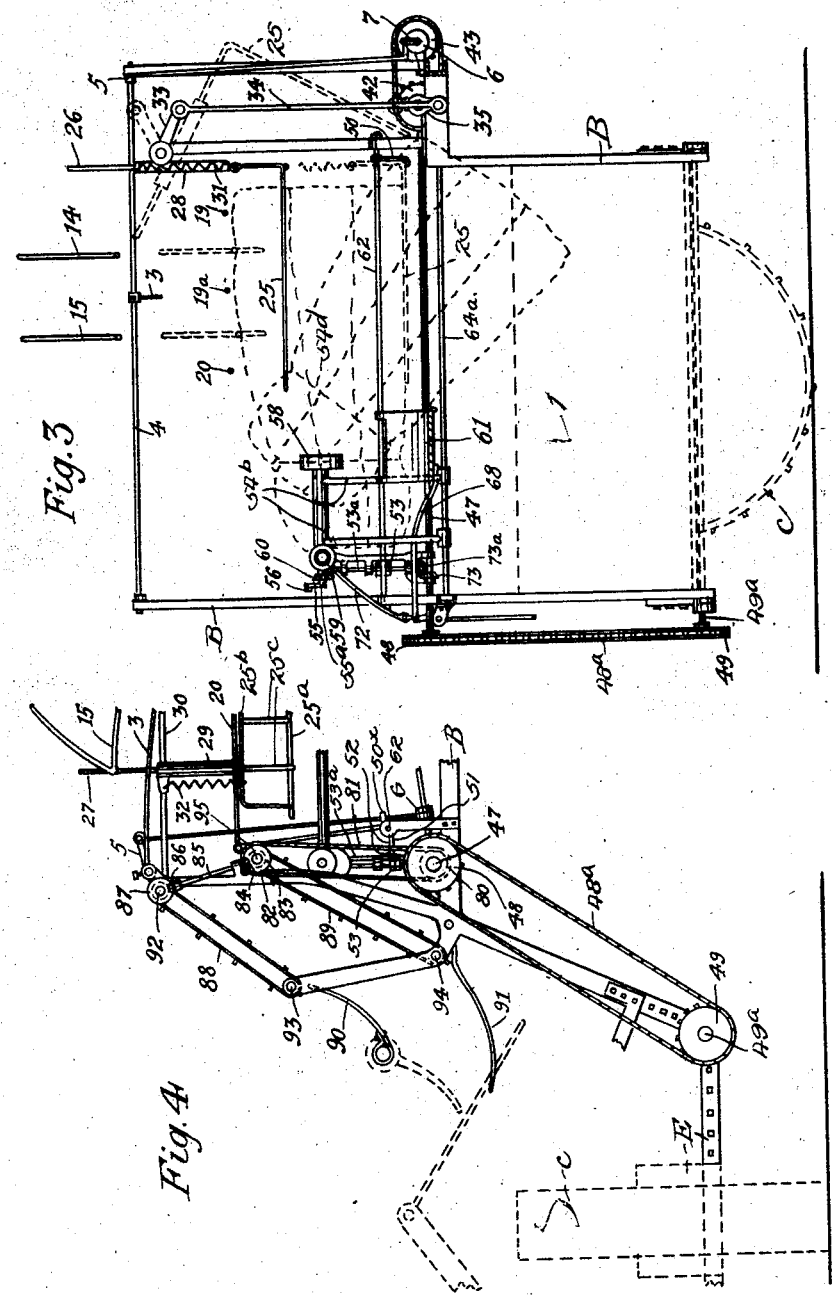

Patented Sept. 1, 1925.

1,551,555

UNITED STATES PATENT OFFICE.

CLAYTON D. GRIFFIN, OF OLIVIA, MINNESOTA.

GRAIN SHOCKER.

Application filed January 26, 1920. Serial No. 354,307.

*To all whom it may concern:*

Be it known that I, CLAYTON D. GRIFFIN, a citizen of the United States, residing at Olivia, in the county of Renville and State of Minnesota, have invented a certain new and useful Grain Shocker, of which the following is a specification.

My invention relates to improvements in grain shockers, in which the shocker travels in parallel line with a harvesting machine, and in which shock forming and tying mechanisms operate in conjunction with a delivery mechanism on the harvesting machine; and the objects of the invention are: first, to provide a means for delivering grain bundles from the delivery side of the harvester to a shock former high enough above the ground level to permit the shock forming and tying mechanisms to pass over the top of the shock after the latter has been deposited in standing position on the ground: second, to provide a means for depositing two or more bundles in a receptacle, laying them side-by-side in flat and uniform position as a layer, then other layers on the top of the first one; then forming and tying the bundles in the form of a shock, and then depositing the shock in standing position on the ground, a retarding device being used to cause the shock to tilt to an upright position during its fall to the ground; said retarder being adjustable according to the length of the bundles or shock.

I attain these objects by the mechanisms illustrated in the accompanying drawings, in which: Fig. 1 is a top plan view of my shocker and of the adjacent parts of a harvester in dotted outlines. Fig. 2 is a rear elevation of Fig. 1 with rod 56, crank 55 and rocker arm 57 omitted since the same are clearly shown in Figures 1 and 3 and would tend to obscure Fig. 2. Fig. 3 is a longitudinal sectional view on the line 3—3 in Fig. 1. Fig. 4 is a modification of a portion of Fig. 2, showing a modified means for delivering bundles from the harvester to the shock former. Fig. 5 is an enlarged detail view of certain parts shown in Fig. 1.

Referring to the drawings by reference numerals, and some letters, A designates a supporting wheel which if so desired may be employed under the outer side or edge of the frame B of the shocker, the other edge of said frame being supported by the bull-wheel C and frame portion D of the harvester. In said frame B I mount a bundle guide composed of upper and lower curved and inclined bars 1 and 2, respectively, which guide the bundles (as 49$^b$) upward and upon rods or tines 19, 19$^a$ and 20, which together with a uniting bar 20$^a$ form a fork, which is slidable between rollers 21, 22, 23, 24, and is operated by having an upwardly bent portion 20$^b$, (see Fig. 2) engaged by yoke-shaped portions 18$^a$ of two arms 17, 18, which are fulcrumed on a round frame bar 13 and have their lower ends formed with yokes 18$^c$, in which operate two cranks 11 of a shaft 10, which shaft is rotated by bevel gears 8, 9, and a shaft 7 composed of two sections, 7$^a$ and 44, connected by a clutch 6, one member of which is disengageable from the other, against the resistance of a spring (not shown), by a shifter arm 5, fixed on a rock-shaft 4, carrying a trip arm 3.

On the short section 44, of the shaft 7 is fixed a bevel gear 46, driven by a bevel gear 45 fixed on a shaft 47, having a sprocket 48 driven by a link-belt 48$^a$ and a sprocket 49 fixed on a shaft 49$^a$ of the harvester. In order that the shaft section 44 and shaft 41 may rotate continuously. The section 44 and shaft 41 are connected by sprockets 42, 43 and link-belt 43$^a$. Through this arrangement it will be understood that whenever two or more bundles 49$^b$ raise the trip arm 3, the clutch 6 becomes active and the tines 19, 19$^a$ and 20 are retracted from under the bundles, so that they may be pressed down by arms 14, 15 into a bundle receptacle, whose bottom is composed of parallel bars or tines 25, presently to be more fully described. The pressure arms 14, 15 are fulcrumed on the shaft 13 and have their lower ends connected together by a bar 16$^a$, carrying an antifriction roller 16, which is raised by a cam 12 fixed on the shaft 10, and is returned downward by a spring 16$^b$ (shown in Fig. 1).

Turning now to a further description of the bundle receptacle, it will be seen in Fig. 2 that it is formed of the said bars 25 and uniting bars 25$^a$ and 25$^b$ and short vertical bars 25$^c$, and the front end of the receptacle is provided with two vertical rigid arms 26, 27, which are slidable in normally vertical guiding sleeves 28, 29, fixed on a rock-shaft 30; said sleeves have projections from which depend pulling coil springs 31, 32, supporting the receptacle, so it may yield downwardly for each layer of bundles placed in it.

Fixed on rock-shaft 30 is a rocker arm 33, operated by a connecting rod 34 and a crank 35 fixed on the short section 41ª of a shaft 41, which rotates continuously when the harvester is in motion. The short and long sections of shaft 41 are connected by a clutch 36, controlled by a shifter 37 fixed on a rock-shaft 38, having a radial arm 39 operated by a finger 40, which may project from the rear end of a needle 54; the latter being fixed on a short shaft 54ª, journaled in a frame 54ᵇ, which is slidable on two frame bars 54ᶜ. The arm 39 is slidably keyed on rock-shaft 38 and suitably engaged by the frame 54ᵇ to slide with it.

The frame 54ᵇ is movable by having a downwardly extending arm 72 engaged by a rocker arm 71 of a shaft 70, having a hand lever 69 carrying a dog-lever and dog engaging a notched sector 69ª.

The needle 54 is swung to and away from the knotter and knife 58, by its shaft 54ª, the latter being rocked by its arm 57 (see Fig. 1) and a rod 56 and a crank 55. The latter crank is fixed on a shaft 55ª, the same as the knotter 58.

To cause the needle to approach the knotter at the proper time for tying a shock, I employ the following means: I fix on the shaft 55ª a bevel gear 60, which is driven by a bevel gear 59 fixed on a vertical shaft 53ª; the latter shaft is made up of two sections connected by a clutch 53; the lower section of the shaft is geared to shaft 47 to run all the time, by gears 73, 73ª; said gear 73 is slidably keyed on shaft 47, and said clutch is controlled by a shifter arm 52 projecting from a U-shaped yoke 51, which has its two main arms pivoted on a frame rod 62 (see Figs. 1 and 5); one of said main arms 50 has a projection 50ˣ arranged to be pressed downward by the adjacent corner or projection 25ˣ of the bundle receptacle 25 when the latter reaches its lowest position, and is holding a shock ready to be tied. Such tilting of the yoke 50 causes its arm 52 to move clutch 53 into operative position.

61 is a downwardly arched plate, which is slidable on two frame bars 62, 63, on which it may be slid toward and away from the receptacle by a connecting rod 68 and rocker arm 67 of a shaft 66 (see Fig. 2) having a hand lever 65 engageable with a toothed sector 65ª.

Auxiliary means for conveying the bundles to the shocker consist of two sets of packers or actuators 76, 77, operated by cranks 77ª of two shafts 74 and 75, which have sprockets 78, 79 driven by a link belt 79ª from a sprocket 80.

In the operation of the machine, the shocker being connected to the harvester and set in readiness for operation, the different parts assume the positions shown in Figs. 1 and 2 of the drawing; the bundles are delivered from the harvester into the skeletoned guide 1, 2, and are forced upward and inward by the usual packers F of the harvester and the auxiliary packers 76, 77 of the shocker. When a certain number of bundles according to their size, have thus been moved into a layer upon the fork or rods 19, 19ª, 20, said bundles come in contact with the trip arm 3, which is fixed on and turns a rock shaft 4. The latter has a rocker arm 5 which operates to engage the clutch 6. When the latter is engaged it operates the shaft section 7ª, bevel gears 8 and 9, the shaft 10, the cranks 11, 11 and the cam 12, causing the cranks 11 to withdraw the slidable bars 19, 19ª, 20, and allow the layer of bundles to be forced downward onto and with the bundle receptacle, by means of the compression arms 14, 15. Said arms are then raised and the bars 19, 19ª and 20 returned to normal position to receive more bundles upon the first layer in the receptacle. When the above described operation has been repeated a sufficient number of times to make a shock, the bundle receptacle is forced into contact with the yoke arm 50—50ˣ, which swings the yoke 51 and the shifter arm 52, which latter operates to engage the clutch 53 with the continuously rotating shaft 47. When the clutch 53 is thus engaged it operates the needle 54 by means of the crank 55, the connecting rod 56 and the crank 57. The needle 54 carries the twine to the knotter and knife 58, which are operated by means of the bevel gears 59 and 60 when the clutch 53 is engaged. The operation of the needle, knotter and knife ties the bundles together forming a shock in readiness for depositing on the ground.

When the needle 54 reaches the farthest end of its forward movement the trip 40 comes into contact with the trip finger 39, which turns the trip rod 38 which lifts the trip finger 37 and engages the clutch 36.

When the clutch 36 is engaged it operates the bundle receptacle 25 by means of the cranks 33 and 35 and the connecting rod 34, causing the receptacle to swing downward and forward out of the path of the falling shock. The shock in falling comes with its head end in contact with the retarder 61 which causes the shock to reach the ground in standing position. To cause this turning of the shock whether the shock is long or short, the retarder is regulated by the rod 68, shaft 66 and handlever 65, toward or away from the receptacle according to the height of the grain being harvested.

To regulate the position in which the band is placed on the shock, the frame 54ᵇ and the tying mechanism it carries are moved to the proper position by the lever 69.

The bundle receptacle is yieldingly connected with the swinging sleeves 28, 29, as already described, and is therefore raised again to normal position by the springs 31, 32 after the discharge of each shock. And the entire mechanism is located high enough to pass above the shock after it has been deposited in standing position on the field.

In the modification shown in Fig. 4 the endless conveyors 88 and 89 are engaged by rollers 92, 93, 94 and 95 and said rollers are rotated by means of the sprocket 80 located on the continuously rotating shaft 47, the sprocket chain 81, the sprocket 82, the bevel gears 83, 84, the shaft 85, and the bevel gears 86, 87. This modified mechanism may be used to carry the bundles from the harvesting machine into the receptacle 25.

Having thus described my invention, what I claim as new is:—

1. In a shocker for grain harvesters and operatively connected with the operated parts of the latter, a frame supported high enough to pass over a grain shock standing on the ground, a normally horizontal spring-supported bundle receptacle in which the shock is formed in said frame, a horizontally slidable guided fork close above the receptacle when the latter is in raised position; means for guiding and moving bundles one at a time from the harvester upon said fork, placing them in horizontal layers, and but one layer at a time upon the fork, a trip arm operated by each completed layer of bundles, a clutch mechanism controlled by the trip arm, and means operated by the clutch for withdrawing the fork from under each formed layer to let it rest one layer on the top of the other on the receptacle; pivoted presser arms also operatively connected with the clutch for pressing and holding each layer and the receptacle downward; means for automatically pushing the fork forward again upon the depressed layer in position to receive the next layer, means for raising the presser arms and restoring the trip arm to normal position, and means for tying each shock thus formed.

2. The structure specified in claim 1, said receptacle being open at one end and having at the other end normally vertical guiding arms, tubular guides for said arms to slide in, a horizontal rock shaft secured to the tubes, means for holding said rock shaft with the receptacle in horizontal position during the forming of a shock in same, and means for rocking the shaft so as to tilt the receptacle to let the shock slide out of it to a standing position on the ground, a clutch controlling the rocking of the shaft, and a trip finger in the path of a portion of the tying means to start the clutch into action when the receptacle has reached its lowest point and is to deposit the tied shock.

3. The structure specified in claim 1, and a retarding device engaging the head end of the shock so as to cause the butt end to fall standing on the ground.

4. The structure specified in claim 1, and a retarding device engaging the head end of the shock so as to cause the butt end to fall standing on the ground, and means for shifting the retarding device toward and away from the middle portion of the shock.

5. The structure specified in claim 1, and means for adjusting the binding device toward and away from the butt end of the shock.

6. The structure specified in claim 1; said means for moving the bundles comprising packers on the shocker and auxiliary packers farther up in the guiding means leading to the receptacle.

7. The structure specified in claim 1, said means for moving the fork by the clutch comprising a crank shaft driven by the clutch when the latter is in action, two fulcrumed beam-levers, each having one arm slotted and engaged with the fork to move it, and the other arm formed with a slot in which the crank of the crank-shaft operates.

8. The structure specified in claim 1, the means connecting the clutch with the presser arms comprising a shaft rotated by the clutch when the latter is in action, a cam fixed on the shaft and operatively associated with the presser arms, said cam being timed to hold the presser arms down upon the depressed layer of bundles during such a portion of the rotation of the cam that the fork withdrawn from under the layer will be replaced on the top of it before the arms are raised again, and means for raising said arms after each action of the cam.

9. In a shocking machine having a passage-way for bundles delivered from the adjacent side of a grain harvester, and means for moving the bundles in said passage-way, a bundle receptacle and shock-forming device yieldingly mounted and adapted to move in a vertical course, a movable tying device for tying shocks formed in the receptacle, a clutch operating the tying device and a trip starting the clutch, said trip being located in the path of the downward movement of the aforesaid bundle receptacle and shock forming device.

10. In combination, a harvesting machine, a shocking machine having a passage-way for bundles received from the harvesting machine, movable arms in said passage way for moving the bundles, a bundle receptacle yieldingly mounted on a rock-shaft to move up and down but not to rotate on the shaft; means including a clutch for rocking said shaft, and means for automatically rendering said clutch active when a shock has been formed and tied.

CLAYTON D. GRIFFIN.